(12) United States Patent
Harada et al.

(10) Patent No.: US 6,618,081 B1
(45) Date of Patent: Sep. 9, 2003

(54) IMAGE ACQUISITION DEVICE REMOVING DISTORTION IN IMAGE SIGNALS

(75) Inventors: Sinji Harada, Sakai (JP); Takahiro Mouri, Sakai (JP); Masumi Shoji, Osaka (JP); Iwao Adachi, Moriguchi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/979,167

(22) Filed: Nov. 26, 1997

(30) Foreign Application Priority Data

Nov. 28, 1996 (JP) .............................. 8-317561

(51) Int. Cl.⁷ ................................................ H04N 5/76
(52) U.S. Cl. ..................................... 348/231.6; 348/241
(58) Field of Search ............................. 348/207, 222, 348/231, 239, 241, 252, 335, 340, 500, 147, 207.99, 222.1, 231.99, 231.3, 231.6; 382/293, 44

(56) References Cited

U.S. PATENT DOCUMENTS

| | | | |
|---|---|---|---|
| 4,368,484 A | 1/1983 | Stemme et al. | |
| 4,602,291 A | 7/1986 | Temes | |
| 5,048,102 A | * 9/1991 | Tararine et al. | 382/300 |
| 5,067,019 A | * 11/1991 | Juday et al. | 348/500 |
| 5,185,667 A | * 2/1993 | Zimmermann | 348/207 |
| 5,717,200 A | 2/1998 | Hashimoto | |
| 5,796,426 A | * 8/1998 | Gullichsen et al. | 348/207 |
| 5,818,527 A | * 10/1998 | Yamaguchi et al. | 348/335 |

* cited by examiner

*Primary Examiner*—Tuan Ho
(74) *Attorney, Agent, or Firm*—McDermott, Will & Emery

(57) ABSTRACT

The image acquisition device of the present invention includes an image forming lens to form a condensed image, a CCD to convert a condensed image to electric signals, and flag table memory to store predetermined correction flags, which indicate whether or not to cull a pixel so as to correct distortion caused by the image forming lens. The image acquisition device further includes a distortion correction circuit to execute the culling of pixels included in image signals in accordance with a correction flag for each pixel. The image acquisition device removes the distortion component contained in the image signal in real time.

29 Claims, 5 Drawing Sheets film 1 optical image

| pixel address by address generator 15 | pixel address by address generator 15a |
|---|---|
| (0, 0) → | (0, 0) |
| (N/2, 0) → | (N/2, 0) |
| (N, 0) → | (0, 0) |
| ⋮ | ⋮ |
| (0, M/2) → | (0, M/2) |
| (N/2, M/2) → | (N/2, M/2) |
| (N, M/2) → | (0, M/2) |
| ⋮ | ⋮ |
| (0, M) → | (0, 0) |
| (N/2, M) → | (N/2, 0) |
| (N, M) → | (0, 0) |

IMAGE ACQUISITION DEVICE REMOVING DISTORTION IN IMAGE SIGNALS

BACKGROUND OF THE INVENTION

1. Field of the Invention

The present invention relates to an image acquisition device capable of reading image information recorded on film and the like.

2. Description of the Related Art

Heretofore, devices such as film scanners and the like have been known as image acquisition devices which optically read photographic negative film as a digital image.

Such film scanners generally use line or area charge-coupled devices (CCD) to photoelectrically convert the optical image of a negative film (or positive film) to read the image information of the film. When a line CCD is used, the image information of a negative film is read by moving the negative film relative to a line-type optical image reader/sensor. In such arrangements, various methods of line scanning are used to scan an optical image using mirrors and the like.

In known devices, however, the size of the CCD is smaller than the negative film, requiring the use of lenses to form a compressed optical image of the negative film on the surface of the CCD. Therefore, the digital image obtained is affected by aberrations in the lenses. For example, a square optical image may be affected by pin cushion distortion caused by distortion in a lens. Furthermore, there is a tendency for such distortion to increase when optically scanning using mirrors and the like. In order to optically reduce such distortion, it is necessary to increase the number of layers of the required lenses, thereby enlarging the device and increasing its cost.

For these reasons, methods are used to remove distortion by digitally modifying the obtained digital image in order to eliminate distortion from the digital image. Such methods include various software processing techniques comprising temporarily storing a digital image in a buffer memory, and methods using hardware to process digital images in real time. Software based methods are disadvantageous insofar as software processing requires longer time periods for higher resolution digital images which increase the amount of data to be processed. Hardware based methods are disadvantageous insofar as hardware processing requires more hardware circuits, thereby increasing the size of the device, as well as overall cost.

SUMMARY OF THE INVENTION

An object of the present invention is to eliminate the foregoing disadvantages.

A further object of the present invention is to provide an image acquisition device capable of reading images and removing distortion caused by the optical system.

A still further object of the present invention is to provide an image acquisition device capable of electrically removing distortion caused by the optical system.

Another object of the present invention is to provide an image acquisition device capable of removing distortion components included in image signals in real time.

A further object of the present invention is to provide an image acquisition device capable of removing distortion components included in image signals in real time via a simple circuit design.

These and other objects are attained by an image acquisition device capable of converting optical images formed via an optical system to a plurality of pixel signals, the image acquisition device being provided with a storage means to store correction data related to culling a plurality of pixels corresponding to the distortion inherent in an optical system, and a correction means to execute the culling of pixels in accordance with the correction data.

The aforesaid objects of the present invention are further attained by an image acquisition device comprising an optical unit for projecting an image, a reading means to obtain image data by reading an image projected by the optical unit, and a correction means to cull the image data corresponding to the distortion of the optical unit.

The aforesaid objects of the present invention are further attained by providing an image acquisition device comprising a projection lens for projecting an image, photoelectric conversion elements to read an image projected by the projection lens, moving means to move the projected image relative to the photoelectric conversion elements at constant speed in the subscan direction, memory to store correction data corresponding to the distortion of optical unit, and correction means to cull the image data in accordance with the correction data.

BRIEF DESCRIPTION OF THE DRAWINGS

These and other objects and features of the present invention will become apparent from the following description of the preferred embodiments thereof taken in conjunction with the accompanying drawings, in which.

In the following description and figures, like parts are designated by like reference numbers.

DETAILED DESCRIPTION OF THE PREFERRED EMBODIMENTS

An image acquisition device in accordance with the present invention is described below. In the following description, numerous specific details are set forth in order to provide a thorough understanding of the present invention. It will be obvious, however, to one skilled in the art that these specific details need not be employed exactly as set forth herein to practice the present invention.

Figure 1:
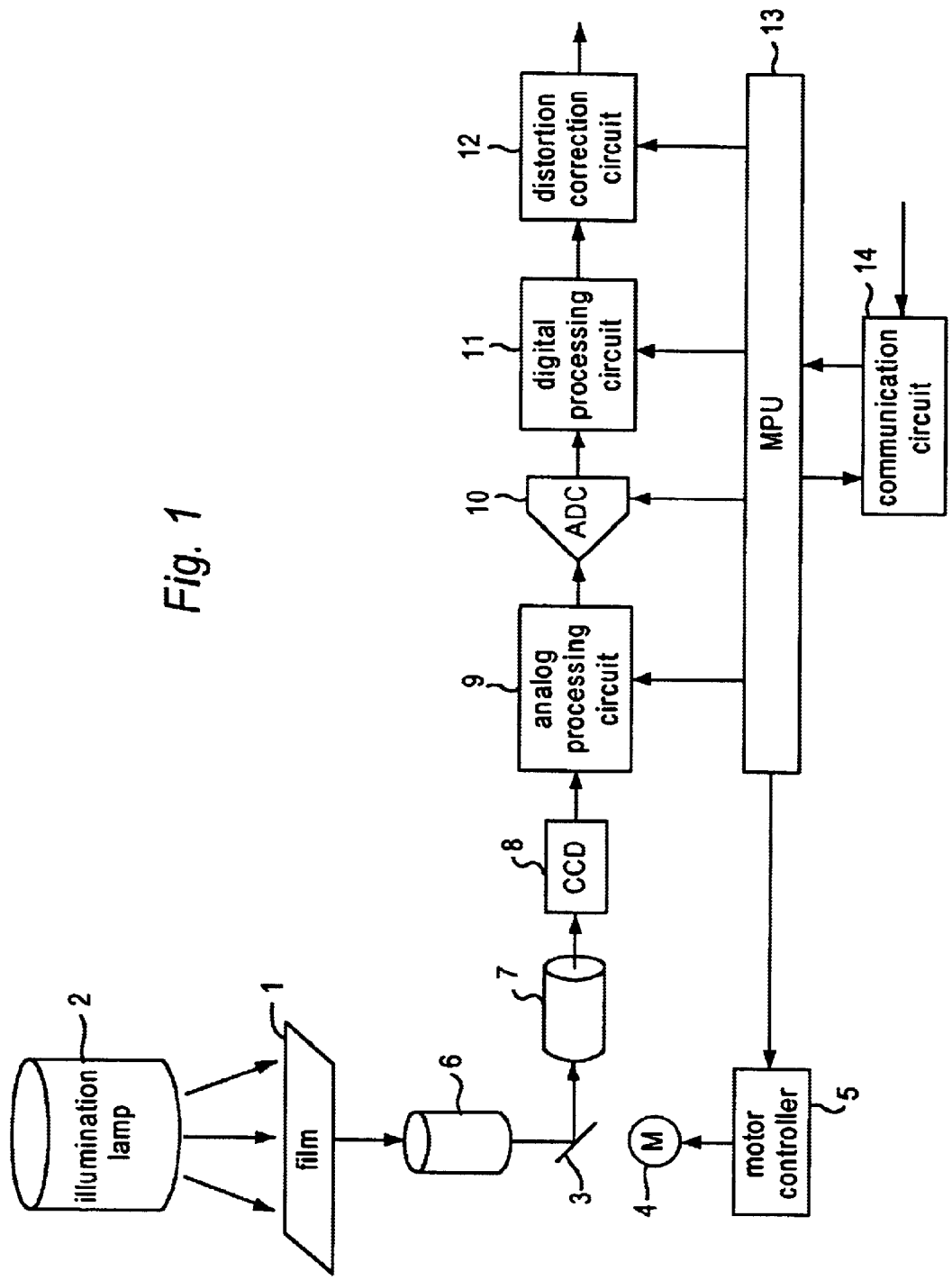
FIG. 1 illustrates a first exemplary embodiment of the image acquisition device of the present invention.

A first embodiment of the image acquisition device of the present invention is described hereinafter with reference to FIG. 1. As shown in FIG. 1, film 1 is a negative film, and illumination lamp 2 is a lamp which illuminates an entire frame of the film.

The line scanning unit in the present embodiment comprises a scanning mirror 3, a stepper motor 4, and a motor controller 5. The line scanning unit line-scans the entire frame of film 1 by guiding the light transmitted through film 1 illuminated by illumination lamp 2 via an operation described later. The motor controller 5 is a circuit which generates drive pulses in conjunction with control signals output from an MPU 13 described later. The stepper motor 4 is a motor which rotates scanning mirror 3 at variable speed (described later) via the drive pulses transmitted from motor controller 5. The scanning mirror 3 is rotated in conjunction with the aforesaid drive pulses. Therefore, the light transmitted through a lens 6 (described later) moves within the incidence plane of a lens 7 (described later).

The lenses 6 and 7 are f-tan [θ] photographic lenses. Each lens 6 and 7 comprise an image forming optical unit for forming an image in a backward direction using the light transmitted through film 1. In the present embodiment, the scanning mirror 3 is disposed between lens 6 and lens 7.

The CCD 8 is a CCD line sensor comprising a plurality of photoreceptor elements arranged in a linear array. CCD 8 photoelectrically converts the line-like optical image (hereinafter referred to a "linear optical image") of film 1 formed via an image forming unit to a plurality of pixel signals which form a line-like image (hereinafter referred to as "line image"). CCD 8 is arranged at a position to form the light transmitted through film 1 as a linear optical image via photographic lens 6, scanning mirror 3, and photographic lens 7. CCD 8 reads the entire frame of film 1 by sequentially reading linear optical images in a sub-scan direction perpendicular to a main scan direction via the rotation of scanning mirror 3 while reading the linear optical image of film 1 in a main scan direction (i.e., the line direction of CCD 8). An analog processing circuit 9 is provided to execute signal processing, such as signal amplification, offset adjustment and the like on each pixel signal of a line image read by CCD 8. A analog-to-digital (A/D) converter "ADC" 10 is provided to convert each pixel signal subjected to signal processing by analog processing circuit 9 into digital signals (pixel data). A digital processing circuit 11 is provided to execute various correction processing, such as black-level correction, white-level correction, halftone correction such as LUT and the like, on pixel data of a line image subjected to A/D conversion by ADC 10.

Distortion correction circuit 12 is described in detail below with reference to FIG. 2. Distortion correction circuit 12 is provided to remove the distortion component from the pixel data of a line image, which has been subjected to signal processing by digital processing circuit 11, by culling pixel data determined to be the source of distortion. That is, address generator 15 counts the number of outputs of image strobe signal/STBpx1 transmitted together with pixel data from digital processing circuit 11, and generates a pixel address for the pixel data. The flag table memory 16 is a ROM used to store predetermined correction flags corresponding to pixel addresses of a plurality of line images obtained by a scan of each sub-scan line. The correction flags determine whether an image strobe signal/STBpx1 output from digital processing circuit 11 is enabled or disabled. Determination circuit 17 is provided to determine whether the image strobe signal/STBpx1 is output as a write signal/WR based on the correction flag output from the flag table memory 16. First-in-first-out (FIFO) memory 18 is provided to sequentially store pixel data output from the digital processing circuit 11 based on the presence/absence of a write signal/WR output from the determination circuit 17.

Referring again to FIG. 1, the MPU 13 is a microprocessor used to control the motor controller 5, the analog processing circuit 9, the ADC 10, the digital processing circuit 11, and the distortion correction circuit 12. A communications circuit 14 is provided to receive instructions from external devices not shown in the drawing, so as to allow the image of film 1 to be read in accordance with instructions from the external devices.

The operation of the present embodiment is described below.

Illumination lamp 2 illuminates film 1 disposed at a specific position in the image acquisition device. Motor controller 5 generates a drive pulse and amplifies the power in conjunction with control signals transmitted from MPU 13. Thereafter, the power-amplified drive pulse is transmitted to stepper motor 4. Stepper motor 4 rotates the scanning mirror 3 in accordance with the drive pulses transmitted from motor controller 5 such that the light transmitted through film 1 generated by illumination lamp 2 is guided by the rotating scanning mirror 3 so as to line-scan the entire surface of film 1 in the main scan direction for each subscan. The transmission light guided by the rotating scanning mirror 3 forms a linear optical image on the surface of CCD 8 in a backward direction via the image forming action of photographic lenses 6 and 7. The linear optical image formed on the surface of CCD 8 is photoelectrically converted to pixel signals comprising the line image via the CCD 8.

These line image pixel signals are subjected to analog processing such as signal amplification and offset adjustment by analog processing circuit 9. After analog processing, the line image pixel signals are sequentially converted to digital value pixel data via ADC 10. After digital conversion, the line image pixel data are then subjected to digital processing such as black-level correction, white-level correction, and halftone correction, such as LUT in synchronization with a predetermined timing signal by digital processing circuit 11. After digital processing, the line image pixel data are transmitted from digital processing circuit 11 to distortion correction circuit 12 together with the image strobe signal/STBpx1 which provides the output timing of the pixel data. The aforesaid processes are executed in accordance with timing signals generated by analog processing circuit 9, ADC 10, and digital processing circuit 11.

Figure 2:
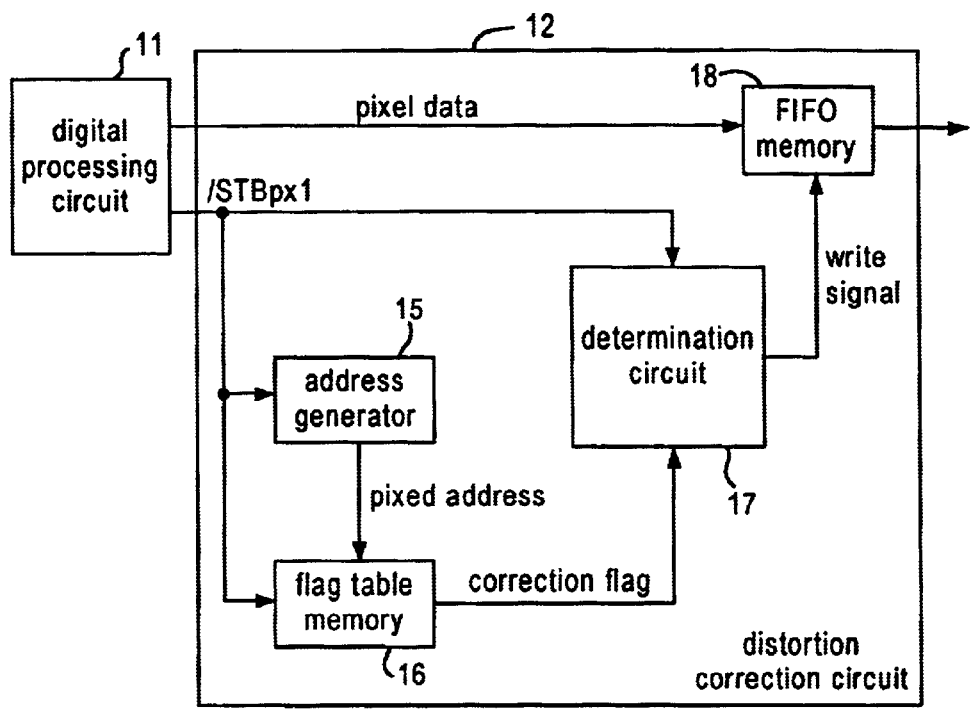
FIG. 2 illustrates a exemplary embodiment of a distortion correction circuit 12.

In FIG. 2, address generator 15 counts the number of outputs of image strobe signal/STBpx1 transmitted together with pixel data from digital processing circuit 11, and generates a line image containing the pixel data and pixel addresses to specify the position of the line image for the pixel data transmitted together with the image strobe signal/STBpx1. The flag table memory 16 stores predetermined correction flags corresponding to each pixel address. The correction flags determine whether an image strobe signal/STBpx1 output the from digital processing circuit 11 is effective or ineffective, and transmits to the determination circuit 17 the correction flags corresponding to a pixel address generated by address generator 15. At this time, the image strobe signal/STBpx1 functions as an output enabling signal for flag table memory 16, and when a pixel address is generated by address generator 15, the correction flag corresponding to the pixel address is transmitted to determination circuit 17.

Figure 3A:
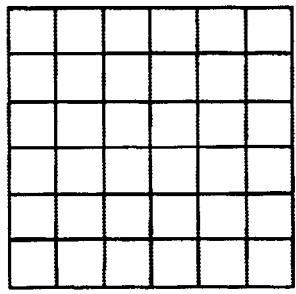
FIGS. 3a and 3b illustrate an exemplary embodiment of the correction flag determination method.

The method of determining the correction flag is described below with reference to FIGS. 3a and 3b. The content of the correction flag corresponding to each pixel address is predetermined based on distortion information of photographic lenses 6 and 7, and the scanning angle of mirror 3. When the square-shaped frame of a film 1 having equally spaced horizontal and vertical lines as shown in FIG.

Figure 3B:
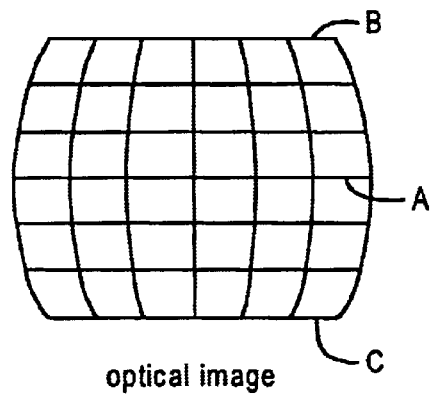

3a is subjected to image formation via photographic lenses 6 and 7 and scanning mirror 3, the total image comprising the various linear optical images formed on the surface of CCD 8 produces a barrel-shaped optical image as shown in FIG. 3b due to the distortion inherent in the lenses 6 and 7 and scanning mirror 3. Therefore, CCD 8 reads this barrel-shaped optical image as image signals. Among the plurality of line images obtained by CCD 8 reading the linear optical image in the main scan direction as line images in each subscan line, the line images A of the main scan component positioned in the center in the subscan direction are longer than line images B and C of the main scan component positioned at the leading edge and trailing edge in the subscan direction. That is, the distortion rate of the plurality of line images read by CCD 8 changes in the sub-scan direction.

Motor controller 5 controls the rotational speed of the stepper motor 4 (i.e., the rotational speed of scanning mirror 3) so as to attain movement at constant speed based on the integral time of CCD 8, such that each linear optical image formed on the surface of CCD 8 passes the surface of CCD 8 at constant speed for each sub-scan. As a result, the plurality of line images obtained by the reading operation of CCD 8 form a distortionless image in the sub-scan direction.

Accordingly, pixels of each line image positioned between line image B and line image C may be culled at a culling rate corresponding to the aforesaid distortion rate so as to render the lengths of line image B and line image C equal when accomplishing distortion correction of an optical image which has distortion only in the main scan direction. When the distortion rate of a linear optical image formed on the surface of CCD 8 of each sub-scan is designated distortion rate [delta](Y) (where Y is the pixel address in the sub-scan direction), the distortion of the linear optical image can be corrected based on Equation (1) below.

$$I'(X) = I([\text{delta}](Y) \cdot X) \quad \text{Eq. (1)}$$

(Where I'(X) is the pixel data after correction of the main scan direction pixel address X, and I(X) is the pixel data before correction of the main scan direction pixel address X.)

The X and Y pixel addresses set the origin point of the X-Y coordinate system circumscribed by the X, Y axes as a reference point in the barrel-type optical image formed by the various linear optical images formed on the surface of CCD 8. Distortion correction using the aforesaid Equation (1) is accomplished by storing the pixel data specified by the Y and [delta](Y)·X pixel addresses in pixels specified by the Y and X pixel addresses. As a result, the pixels which are not specified by the Y and [delta](Y)·X pixel addresses are culled. In actual practice, since each pixel composing a line image is discretely sampled, the pixel data specified by the pixel address nearest the [delta](Y)·X pixel address are designated as the pixel data specified by the X pixel address. This conversion operation is executed for each pixel address of each line image read by CCD 8. In order to execute this conversion operation, a true correction flag is allocated to the pixel address nearest the [delta](Y)·X pixel address, and a false correction flag is allocated to all other pixel addresses, and these correction flags are stored in flag table memory 16.

Determination circuit 17 determines whether or not the image strobe signal/STBpx1 transmitted from digital processing circuit 11 is output as a write signal/WR based on the correction flag transmitted from flag table memory 16 corresponding to the image strobe signal/STBpx1. More specifically, when the correction flag enables the image strobe signal/STBpx1 (i.e., when the correction flag is true) the determination circuit 17 outputs the image strobe signal/STBpx1 as a write signal/WR to FIFO memory 18. Furthermore, when the correction flag disables the image strobe signal/STBpx1 (i.e., when the correction flag is false) the determination circuit 17 stops the operation of outputting the image strobe signal/STBpx1 as a write signal/WR to FIFO memory 18.

FIFO memory 18 executes a writing operation for pixel data transmitted together with image strobe signal/STBpx1 from digital processing circuit 11 based on the presence/absence of a write signal/WR transmitted from determination circuit 17 corresponding to the image strobe signal/STBpx1. That is, the FIFO memory 18 stores pixel data if a write signal/WR is transmitted from determination circuit 17, and does not store the pixel data if a write signal/WR is not transmitted from the determination circuit 17. These operations are executed in real time synchronously with the image strobe signal/STBpx1.

In the present embodiment, a memory means such as a random access memory (RAM), dual port RAM, or register may be substituted for the FIFO memory 18.

Although the film 1 is a negative film, the film of the present embodiment is not limited to photographic film, inasmuch as characters, numbers, symbols, and graphics formed on a transparent sheet may also be used. Furthermore, the media need not be a sheet, insofar as it reflects or emits light capable of forming an optical image on the surface of CCD 8.

Figure 4:
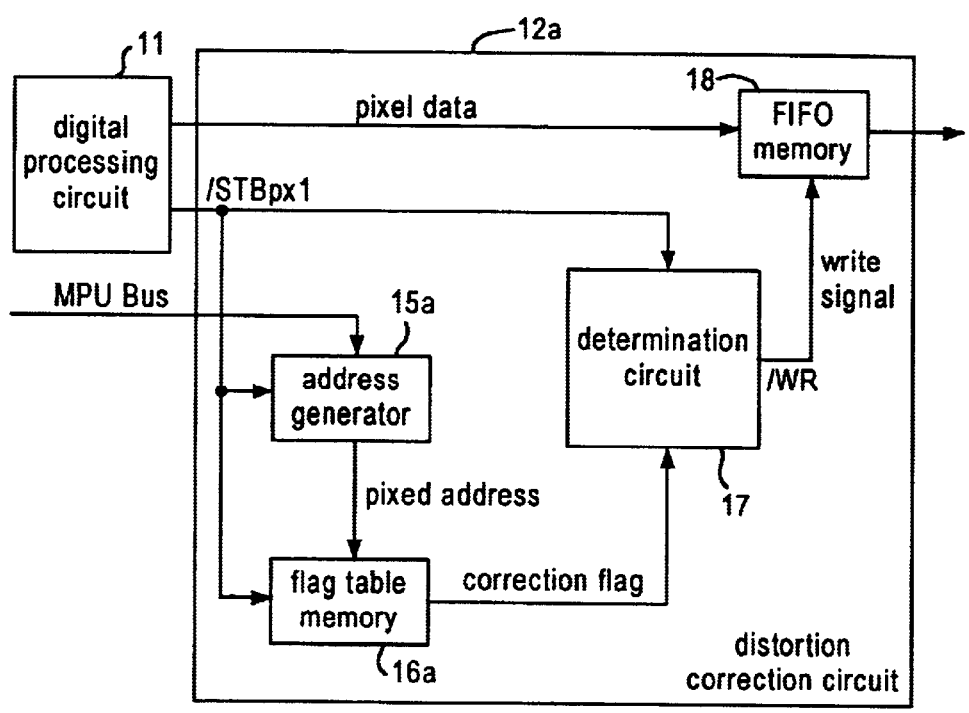
FIG. 4 illustrates a second embodiment of a distortion correction circuit.
Figure 5:
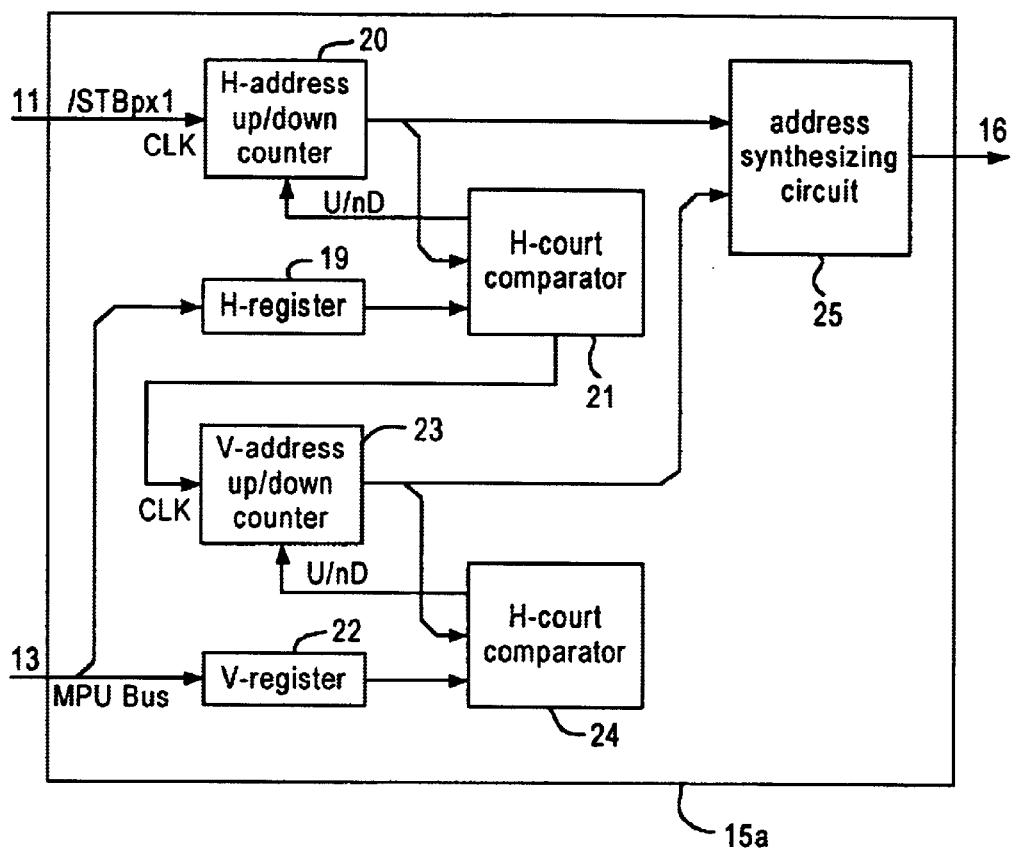
FIG. 5 illustrates an exemplary embodiment of the address generator of the second embodiment.

A second embodiment of the present invention is described hereinafter with reference to the drawings. Components identical to those of the first embodiment are omitted from the present description, whereas components which differ from those of the first embodiment are described below. FIG. 4 illustrates an exemplary design of the digital processing circuit 11 and details of the distortion correction circuit 12 of the second embodiment. FIG. 5 illustrates an exemplary design of the address generator 15a of the second embodiment.

Figure 6:
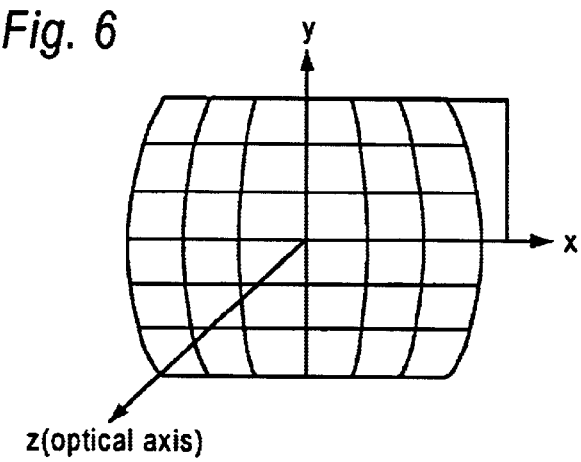
FIG. 6 illustrates an exemplary method for reducing the amount of memory of the flag table memory.

In FIG. 4, flag table memory 16a is provided to store correction flags using less memory than the aforesaid flag table memory 16. In the first embodiment, correction flags were predetermined for the entirety of the barrel-type optical image shown in FIG. 3 and stored in flag table memory 16 shown in FIG. 2, whereas in the second embodiment, correction flags are created predetermined for coordinates of part of the barrel-type optical image and stored in flag table memory 16a. That is, the barrel-type optical image of FIG. 3 has a shape with rotational symmetry about the optical axis as shown in FIG. 6. This means the distortion component is rotationally symmetric. Accordingly, the amount of memory required for storing correction flags can be reduced if correction flags are only generated for the barrel-type optical image within the range of the positive X-axis and the positive Y-axis (i.e., ¼ the size of the barrel-like optical image of FIG. 3), and thereafter stored in flag table memory 16a.

Figure 7:
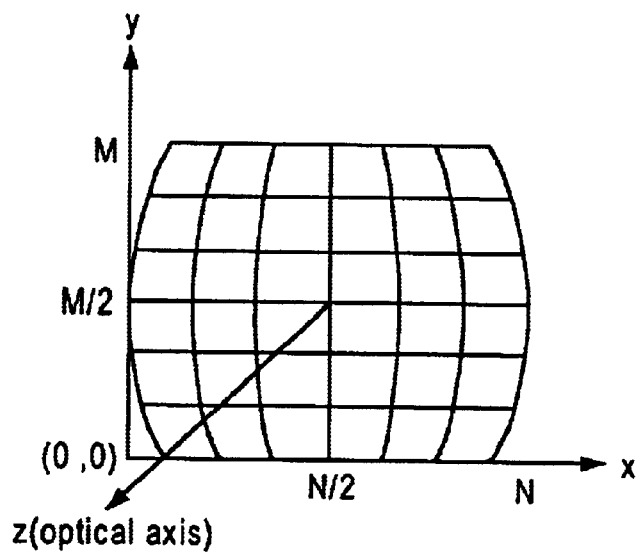
FIG. 7 illustrates the relationship between the pixel addresses of the address generators of the first and second embodiments.

In the second embodiment, the pixel addresses generated by address generator 15a differ from the pixel addresses generated by the address generator 15 of FIG. 2, as shown in FIG. 7. That is, as shown in FIG. 5, the H-register 19 is provided to store the number of pixels comprising the line image in the main scan direction as an H-register value. The input pin of the H-register 19 is connected to the bus of MPU 13 shown in FIG. 1, and the H-register value is rewritable via control signals output from MPU 13. Therefore, if the number of pixels of the line image is written to the H-register 19, it is possible to set the size in the X-axis direction of the linear optical image read as the line image. The H-address up/down counter 20 increments and decrements based on the comparison result of H-count comparator 21 using the image strobe signal/STBpx1 as a clock signal, and updates and stores the H-count value. The H-count comparator 21 compares the H-count value and ½ the H-register value, and sets the H-address up/down counter 20 to increment mode if the H-count value is smaller, or sets the H-address up/down counter 20 to decrement mode if the H-count value is equal to or greater than ½ the H-register value.

The V-register 22 is provided to store the number of pixels read in the sub-scan direction of the barrel-type optical image as a V-register value. The input pin of the V-register is connected to the bus of MPU 13 shown in FIG. 1, and is rewritable via control signals output from MPU 13. Therefore, if the number of pixels is written to the V-register 22, it is possible to set the size in the sub-scan direction of a read image. The V-address up/down counter 23 increments or decrements based on the comparison result of the V-count comparator 24 synchronized by a clock signal for each sub-scan generated by the H-count comparator 21, and updates and stores the V-count value. V-count comparator 24 compares the V-count value and ½ the V-register value, and sets the V-address up/down counter 23 to increment mode if the V-count value is smaller, or sets the V-address up/down counter 23 to decrement mode if the V-count value is equal to or greater than ½ the V-register value.

The address synthesizing circuit 25 is provided to combine the H-count value and the V-count value to generate a pixel address.

The operation of address generator 15a is described below.

When the reading operation of a linear optical starts, H-address up/down counter 20 is incremented by the image strobe signal/STBpx1 used as a clock signal, and updates and stores the H-count value. The H-count comparator 21 compares the H-count value and ½ the H-register value stored in H-register 19. As a result of the comparison, the H-address up/down counter 20 is set to increment mode if the H-count value is smaller, or the H-address up/down counter 20 is set to decrement mode if the H-count value is equal to or greater than the ½ the H-register value. The H-count comparator 21: (1) sets the H-address up/down counter 20 to increment mode when the H-count value is set at [0] after decrementing, (2) generates a clock signal simultaneously with the timing by which the count value is set at [0], and (3) outputs the clock signal to V-address up/down counter 23. As this operation is repeated, the H-address up/down counter 20 outputs H-count value iterations of 0, 1, . . . ½ the H-register value, . . . 1, 0, 1, . . . , to address synthesizing circuit 25 as the X pixel address.

In parallel with the aforesaid operation, the V-address up/down counter 23 increments in synchronization with the clock signal of each subscan generated by H-count comparator 21, and updates and stores the V-count value. The V-count comparator 24 (1) compares the V-count value and ½ the V-register value stored in V-register 22, and (2) sets the V-address up/down counter 23 to increment mode if the V-count value is smaller, or (3) sets the V-address up/down counter 23 to the decrement mode if the V-count value is equal to or greater than ½ the V-register value. As this operation is repeated, the V-address up/down counter 23 outputs V-count value iterations of 0, 1, . . . ½ the V-register value, . . . 1, 0, 1, . . . , to address synthesizing circuit 25 as the Y pixel address.

The address synthesizing circuit 25 combines the H-count value and the V-count value to generate a pixel address, and outputs the generated pixel address to flag table memory 16a.

Therefore, it is possible to accomplish distortion correction for the entirety of the barrel-type optical image although the correction flags stored in flag table memory 16a only pertain to ¼ of the region of the barrel-type optical image.

Since the correction flag may be designated as true or false, the correction flag stored for each pixel address need only be 1-bit, and in this case the correction flags of eight individual pixel addresses can be included in 1-byte of data. Accordingly, a parallel/serial converter is provided in the determination circuit 17, so as to accomplish serial conversion of the correction flag 1-byte data to the eight individual 1-bit correction flag data contained therein. Using this construction, the amount of data can be reduced to ⅛ compared to allocating 1-byte of data for each pixel address. Therefore, the amount of memory required for correction flags can be reduced to ¹⁄₃₂ compared to methods allocating 1-byte of data to each pixel address.

As can be clearly understood from the foregoing description, the present invention removes the distortion component including in a read image signal in real time. The present invention further reduces the amount of data used during distortion correction.

In a variation of the foregoing invention, as opposed to culling the data pixels that are distorted by the projection lens, resulting in line images being longer in some scans, it is also possible to perform an interpolation process to correct for the distortion. According to this process, pixel data for a given scan line is interpolated so as to extend the length of the given scan line. In other words, additional data points are generated based on the previous values of the scan line. As a result, data the was truncated by the distortion of a projection lens is regenerated. It is noted that the regenerated data is an approximation of the truncated data.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image acquisition device for converting an optical image formed via an optical system to a plurality of pixels, said image acquisition device comprising:
   a storage means for storing predetermined correction data, said correction data identifying which of said plurality of pixels are to be culled to correct for distortion of said optical system, and
   a correction means for executing the culling of said plurality of pixels by determining, for each pixel of said plurality of pixels, whether or not said each pixel of said plurality of pixels is to be culled in accordance with said correction data, and for said each pixel of said plurality of pixels that is to be culled, not writing said each pixel of said plurality of pixels that is to be culled to a pixel data output memory.

2. An image acquisition device according to claim 1, further comprising:
   an image sensor, comprising a plurality of photoelectric conversion elements, for converting a condensed image to electric signals, said condensed image represented by said plurality of pixels, an analog-to-digital converter coupled to said image sensor for converting said electric signals representing said condensed image into digital signals, and a digital processing circuit coupled to said analog-to-digital converter, said digital processing circuit operative for performing correction processing on said digital signals, and for outputting an image strobe signal representing the location of a given pixel of said plurality of pixels.

3. An image acquisition device according to claim 1, wherein said correction means includes a distortion circuit comprising:

an address generator coupled to said digital processing circuit and operative for generating a pixel address in response to said image strobe signal, and a determination circuit coupled to said address generator, said determination circuit operative for determining whether said each pixel of said plurality of pixels is to be culled, and for controlling writing/not-writing of said each pixel to said pixel data output memory in accordance with said determination.

4. An image acquisition device according to claim 3, said distortion circuit further comprising a flag table memory for storing predetermined correction flags, each of said correction flags indicating whether a given pixel of said plurality of pixels is to be culled.

5. An image acquisition device according to claim 3, wherein said pixel data output memory comprises a FIFO memory coupled to said determination circuit, said FIFO memory operative for storing pixel data upon receipt of a write signal transmitting by said determination circuit.

6. An image acquisition device according to claim 4, wherein said each of said plurality of pixels has a corresponding correction flag.

7. An image acquisition device according to claim 4, wherein a given correction flag indicates whether more than one pixel of said plurality of pixels should be culled.

8. An image acquisition device according to claim 4, further comprising at least one optical lens having a distortion component which is symmetrical about a given axis thereof.

9. An image acquisition device according to claim 8, wherein said correction flags represent correction data corresponding to a first portion of said optical lens, said correction flags corresponding to said first portion being repetitively utilized to correct for distortion caused other portions of said optical lens.

10. An image acquisition device according to claim 9, wherein only said correction flags representing correction data corresponding to a first portion of said optical lens are stored in said flag table memory.

11. An image acquisition device according to claim 10, wherein said address generator comprises:

a first register for storing a value representing the number of pixels in a line image in a first scan direction, a second register for storing the number of pixels in a line image of a second scan direction, a first comparator operative for controlling a first counter, said first counter being incremented if the value stored therein is less than one-half the value stored in said first register, and being decremented if the value stored therein is greater than one-half the value stored in said first register, and a second comparator operative for controlling a second counter, said second counter being incremented if the value stored therein is greater than one-half the value stored in said second register, and being decremented if the value stored therein is greater than one-half the value stored in said second register, said value of said first counter and said value of said second counter being utilized to select a correction flag.

12. An image acquisition device comprising:

an optical system for projecting an image, means for obtaining image data by reading the image projected by said optical system, said image data representing said projected image and including a plurality of pixels, and correction means for culling portions of said image data which represents a distortion of said image by determining, for each pixel of said plurality of pixels, whether or not said each pixel of said plurality of pixels is to be culled, and for said each pixel of said plurality of pixels that is to be culled, not writing said each pixel of said plurality of pixels that is to be culled to an image data output memory, said distortion being generated by said optical system.

13. An image acquisition device according to claim 12, wherein said means for obtaining image data comprises:

an image sensor, comprising a plurality of photoelectric conversion elements, for converting a condensed image to electric signals, said condensed image represented by said plurality of pixels, an analog-to-digital converter coupled to said image sensor for converting said electric signals representing said condensed image into digital signals, and a digital processing circuit coupled to said analog-to-digital converter, said digital processing circuit operative for performing correction processing on said digital signals, and for outputting an image strobe signal representing the location of a given pixel of said plurality of pixels.

14. An image acquisition device according to claim 13, wherein said correction means includes a distortion circuit comprising:

an address generator coupled to said digital processing circuit and operative for generating a pixel address in response to said image strobe signal, and a determination circuit coupled to said address generator, said determination circuit operative for determining whether said each pixel of said plurality of pixels is to be culled, and for controlling writing/not-writing of said each pixel to said image data output memory in accordance with said determination.

15. An image acquisition device according to claim 14, said distortion circuit further comprising a flag table memory for storing predetermined correction flags, each of said correction flags indicating whether a given pixel of said plurality of pixels is to be culled.

16. An image acquisition device according to claim 15, wherein said image data output memory comprises a FIFO memory coupled to said determination circuit, said FIFO memory operative for storing pixel data upon receipt of a write signal transmitting by said determination circuit.

17. An image acquisition device according to claim 16, wherein said each of said plurality of pixels has a corresponding correction flag.

18. An image acquisition device according to claim 16, wherein a given correction flag indicates whether more than one pixel of said plurality of pixels should be culled.

19. An image acquisition device according to claim 16, further comprising at least one optical lens having a distortion component which is symmetrical about a given axis thereof.

20. An image acquisition device according to claim 19, wherein said correction flags represent correction data corresponding to a first portion of said optical lens, said correction flags corresponding to said first portion being repetitively utilized to correct for distortion caused other portions of said optical lens.

21. An image acquisition device according to claim 20, wherein only said correction flags representing correction data corresponding to a first portion of said optical lens are stored in said flag table memory.

22. An image acquisition device according to claim 21, wherein said address generator comprises:

a first register for storing a value representing the number of pixels in a line image in a first scan direction, a second register for storing the number of pixels in a line image of a second scan direction, a first comparator operative for controlling a first counter, said first counter being incremented if the value stored therein is less than one-half the value stored in said first register, and being decremented if the value stored therein is greater than one-half the value stored in said first register, and a second comparator operative for controlling a second counter, said second counter being incremented if the value stored therein is greater than one-half the value stored in said second register, and being decremented if the value stored therein is greater than one-half the value stored in said second register, said value of said first counter and said value of said second counter being utilized to select a correction flag.

23. An image acquisition device comprising:

a projection lens for projecting an image;

photoelectric conversion elements for reading the image projected by said projection lens and providing image data, the image data including a plurality of pixels, means for moving said projected image relative to said photoelectric conversion elements a constant speed in a subscan direction, memory for storing predetermined correction data corresponding to distortion caused by said projection lens; and correction means for culling said image data in accordance with said predetermined correction data by determining, for each pixel of said plurality of pixels, whether or not said each pixel of said plurality of pixels is to be culled, and for said each pixel of said plurality of pixels that is to be culled, not writing said each pixel of said plurality of pixels that is to be culled to an image data output memory.

24. An image acquisition device according to claim 23, wherein said memory for storing predetermined correction data comprises a flag table memory for storing predetermined correction flags, each of said correction flags indicating whether a given pixel of said plurality of pixels representing said image is to be culled.

25. An image acquisition device according to claim 24, wherein said each of said plurality of pixels has a corresponding correction flag.

26. An image acquisition device according to claim 24, wherein a given correction flag indicates whether more than one pixel of said plurality of pixels should be culled.

27. An image acquisition device according to claim 26, further said projection lens has a distortion component which is symmetrical about a given axis thereof.

28. An image acquisition device comprising:

an image forming lens for forming a condensed image, an image sensor, comprising a plurality of photoelectric conversion elements, for converting a condensed image to electric signals, said condensed image represented by a plurality of pixels, a flag table memory for storing predetermined correction flags, each of said correction flags indicating whether a given pixel should be culled to correct for distortion caused by said image forming lens, and a distortion correction circuit for culling said plurality of pixels by determining, for each pixel of said plurality of pixels, whether or not said each pixel of said plurality of pixels is to be culled, and for said each pixel of said plurality of pixels that is to be culled, not writing said each pixel of said plurality of pixels that is to be culled to a pixel image output memory.

29. An image acquisition device comprising:

a projection lens for projecting an image;

conversion means for reading the image and converting the read image to a plurality of pixels;

a pixel output memory receiving respective pixels to be output from the image acquisition device;

a memory for storing predetermined correction data identifying which of said plurality of pixels are to be culled to correct for distortion caused by said projection lens; and a correction controller culling the plurality of pixels by determining, for each pixel of said plurality of pixels, whether or not said each pixel of said plurality of pixels is to be culled in accordance with said correction data, and for said each pixel of said plurality of pixels that is to be culled, not writing said each pixel of said plurality of pixels that is to be culled to a pixel data output memory.

* * * * *